3,057,835
PROCESS OF PRODUCING HIGHLY CRYSTALLINE POLYOLEFINS WITH TITANIUM BOROHYDRIDE CATALYST

Harry W. Coover, Jr., Kingsport, Tenn., assignor to Eastman Kodak Company, Rochester, N.Y., a corporation of New Jersey
No Drawing. Filed Oct. 3, 1956, Ser. No. 613,609
17 Claims. (Cl. 260—93.7)

This invention relates to the catalytic polymerization of normally gaseous α-monoolefins to high molecular weight, highly crystalline solid polymers, and is particularly concerned with the polymerization of aliphatic α-monoolefinic hydrocarbons containing 2–10 carbon atoms, either singly or in admixture, to solid high density polymer by means of a single component catalyst.

For many years, ethylene has been polymerized to solid polymers by means of a high-pressure process as disclosed in U.S. 2,153,553 using pressures in excess of 500 atmospheres and usually of the order of 1000–2000 atmospheres. The resulting polyethylene was a solid polymer having a waxy feel, relatively low density and crystallinity, a low softening temperature and great flexibility. More recently, it has been found that polyolefins of increased density and crystallinity could be prepared by catalytic methods which often operated at lower pressures than were necessary in the conventional high-pressure processes. The high-pressure process, while effective for forming solid polyethylene, was wholly ineffective for polymerizing propylene to solid polymer or for polymerizing other higher α-olefins to solid polymer. Likewise, many of the catalysts which produced highly crystalline, high density polyethylene of greater rigidity were largely or wholly ineffective for polymerizing propylene and other higher α-monoolefins to solid polymer and particularly to solid polymer of very high crystallinity (now known as isotactic polymers).

The catalysts which have been found to produce solid polymers of high crystallinity and high density have hitherto been characterized by the fact that the catalyst has always consisted of at least two components and sometimes three or four components. Thus, for example, Ziegler was able to prepare polyethylene having a molecular weight of only about 5000 using triethyl aluminum as a catalyst (Angew. Chem., 64, 323 (1952)). Using the triethyl aluminum alone, however, Ziegler was unable to obtain a polymer of sufficiently high molecular weight to be useful as a plastic. It was later found that the plastic materials could be obtained by using catalyst mixtures such as mixtures of triethyl aluminum and titanium tetrachloride (Angew. Chem., 67, 541–7 (1955)). A large number of catalyst mixtures have been proposed for polymerizing ethylene, but the plastic polymers have uniformly required mixtures of catalysts as evidenced by U.S. 2,721,189. Furthermore, the combination of triethyl aluminum and titanium tetrachloride under most conditions is wholly ineffective for polymerizing the higher α-olefins containing at least 3 carbon atoms to solid polymer, and it has only been in special instances that a catalyst was highly effective for polymerizing all such α-olefins of 2–10 carbon atoms to solid polymer and particularly to highly crystalline polymers such as are desired from the standpoint of high softening temperature and high rigidity. Certain of the metal hydrides such as lithium aluminum hydride have been used as polymerization catalysts, but again it has been necessary to employ an activator such as a transition metal compound in order to achieve catalytic activity in forming highly crystalline polymers. To my knowledge, no one heretofore has been able to use a single component catalyst to give high molecular weight solid polyolefins. In many cases the catalysts which have been proposed for polymerizing olefins suffer an additional disadvantage in being extremely pyrophoric and difficult to handle in commercial practice.

It is accordingly an object of this invention to provide a new and improved process whereby not only ethylene but also the higher α-olefins containing 3 or more carbon atoms are readily polymerized to high molecular weight polyolefins.

It is another object of this invention to provide a hitherto unknown catalyst consisting of a single catalytic component which is highly effective for polymerizing ethylene, propylene, and higher α-olefins to solid high density polymers of high crystallinity.

Another object of the invention is to polymerize monoolefins to solid polymer using as the sole catalyst titanium borohydride which is effective over an extremely wide temperature and pressure range and which gives highly useful results at relatively low pressures and temperatures as compared to the ordinary high-pressure processes.

Other objects will be apparent from the description and claims which follow.

These and other objects are attained by means of this invention wherein it was found unexpectedly that the normally gaseous α-monoolefinic hydrocarbons containing 2–10 carbon atoms, and particularly the aliphatic α-monoolefins containing either a straight or branched chain configuration, could be converted, either singly or in admixture, in excellent yield to high molecular weight, highly crystalline solid polymers by effecting the polymerization in the presence of titanium borohydride as the sole catalytic component. This was particularly surprising in view of the fact that the closely related lithium aluminum hydride was almost wholly ineffective as a polymerization catalyst for olefins without the use of an activator, and that boron trifluoride which is the only boron compound used heretofore in olefin polymerization gave only liquid polymers when used as a catalyst either alone or in combinations. The single component catalyst embodying this invention not only gives solid polymer of high molecular weight with ethylene as well as the higher monoolefins which is unusual, but also gives the highly crystalline isotactic forms which are particularly desirable for commercial applications. To illustrate the improvement which is achieved by obtaining isotactic or highly crystalline polymers rather than the corresponding atactic or low crystallinity polymers, it should be noted that polyethylene having the highly crystalline form exhibits melting points as high as 137° C. and densities as high as 0.97 whereas the usual atactic polyethylene produced by high-pressure processes softens in boiling water and has a density of the order of 0.91–0.92. Similarly, atactic polypropylene has a melting point of 80° C. and a density of 0.85, whereas isotactic polypropylene has a melting point of about 165° C. and a density of 0.92. This same increase in melting point is evident with the other higher α-olefins as is evidenced by the fact that atactic polybutene-1 has a melting point of 62° C. and a density of 0.87 whereas isotactic or highly crystalline polybutene-1 has a melting point of 128° C. and a density of 0.91. The branched chain olefins are particularly useful in producing very high melting polymers when in the highly crystalline isotactic form as evidenced by the fact that poly-3-methyl butene-1 melts above 250° C., isotactic poly-4-methyl pentene-1 melts at temperatures above 210° C., isotactic poly-4-methyl hexene-1 melts at 188° C. and the highly branched poly-4,4-dimethyl pentene-1 melts at temperatures above 300° C. Since these isotactic polymers also have greatly increased strength and stiffness, it can be seen that these polymers are very desirable from the commercial standpoint for use in making sheeting, fibers, molded articles and the like where these increased physical characteristics are of great importance. Thus, the fibers prepared from the highly crystalline polyolefins have unusually high strength and are relatively inert because of their hydrocarbon structure. With high melting points being possible, the use of such polyolefins in applications where higher temperatures are a necessity thus becomes possible when these polymers can be produced commercially by a catalytic process.

The mechanism by which titanium borohydride functions as a catalyst is not understood, and the invention will not be limited by any theory which might be advanced by way of explanation. It is sufficient to point out that this single component catalyst is equally effective for polymerizing the higher α-olefins which are much more difficultly polymerizable than ethylene which is contrary to the usual experience in olefin polymerization. The polymerization process embodying this invention is carried out in an inert organic liquid vehicle and can be effected at temperatures ranging from room temperature up to as high as 200° C. or higher and at pressures ranging from atmospheric pressure to very high pressures of the order of 20,000 p.s.i. or higher. The concentration of the catalyst in the vehicle can be varied rather widely with good results being obtained at concentrations of catalyst of from 0.01% to 10% by weight based on the weight of the vehicle. In most cases, the preferred concentration of catalyst is in the range of from about 0.1% to about 4.0% by weight of catalyst based on the vehicle. Although the polymerization proceeds at room temperature, optimum polymerization results at somewhat higher temperatures, and it is usually desirable to heat the polymerization mixture to a temperature of 70–200° C. in the course of the polymerization. When ethylene is being polymerized, the temperature is desirably in the range of 90–180° C. for best results, although propylene can be polymerized at temperatures of 70–180° C. with equally good results. The higher olefins such as butene-1, 3-methyl butene-1, 4-methyl pentene-1, 4-methyl hexene-1, 5-methyl hexene-1, 4,4-dimethyl pentene-1 and similar high olefins are desirably polymerized at temperatures in excess of 125° C. and generally at 125°–200° C. or higher.

The pressure employed in practicing the invention can likewise be varied over very wide limits, and it is necessary only to have a sufficiently high pressure to maintain the vehicle in liquid form during the course of the polymerization and at the temperature employed. Generally, pressures of at least 25 p.s.i. are desirable for optimum results and in many cases, particularly with the higher olefins such as propylene and the like, it is desirable to use pressures of at least 200 p.s.i. Generally, the commercial practice of the invention employs pressures of 25–2000 p.s.i. with pressures of 200–2000 p.s.i. being advantageously used.

The inventive process is carried out in liquid phase in an inert organic liquid vehicle which can be any of the well known inert organic solvents which do not contain combined oxygen. Suitable solvents include the aliphatic hydrocarbons such as propane, pentane, heptane or similar alkanes; the aromatic hydrocarbons such as benzene, toluene or xylene; and halogenated hydrocarbons such as trichloroethylene or chlorobenzene. Petroleum fractions of suitable boiling range such as Stoddard solvent, kerosene or gasoline are also suitable. Thus, any of the well known inert solvents can be used provided the solvent is free of water, alcohol, ether or other compounds containing oxygen. Thus, other materials which are suitable as the vehicle include ethylbenzene, isopropylbenzene, ethyltoluene, n-propylbenzene, diethylbenzenes, mono- and dialkylnaphthalenes, n-octane, isooctane, methylcyclohexane, tetralin, decalin and any of the well known inert organic liquids.

The invention is applicable for polymerizing any of the well known α-monoolefinic hydrocarbons, whether straight or branched chained, and is preferably employed for polymerizing the α-monoolefins containing 2–10 carbon atoms. When solid highly crystalline polymer is desired, the invention is preferably employed for polymerizing the straight chain hydrocarbons containing 2–5 carbon atoms such as ethylene, propylene, butene-1 and pentene-1, as well as the branched chain aliphatic α-monoolefins containing 5–10 carbon atoms such as 3-methyl butene-1, 4-methyl pentene-1, 4-methyl hexene-1, 4-methyl hexene-1, 5-methyl hexene-1 and 4,4-dimethyl pentene-1, or the like. The polymers obtained in accordance with this invention have molecular weights greater than 1000 and usually greater than 10,000. The achievement of extremely high molecular weights does not present a problem employing the process herein described, and molecular weights even greater than 1,000,000 can be readily obtained. The polymers embodying the invention usually exhibit crystallinities above 80% as shown by X-ray diagrams and, particularly in the case of polyethylene, crystallinities of above 90% and in many cases of the order of 95% are readily achieved. The polyethylene obtained by means of this invention usually has a density of the order of 0.945 or higher with densities of the order of 0.96 or higher being obtained in many cases. The inherent viscosities as measured in tetralin at 145° C. may be varied from about 0.5 or lower to 5.0 or higher for the polyethylene produced, with melt indices as measured by the standard ASTM method varying from about 0.01 to 20 or higher.

Thus polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection of at least 50,000 p.s.i. The invention also gives correspondingly improved results with the higher polyolefins, and polypropylene obtained by means of the invention has a softening point above 155° C., a density of the order of 0.91 to 0.92, and great strength and stiffness. Similarly, the highly crystalline poly-3-methyl butene-1 has a softening point above 240° C., and the poly-4-methyl pentene-1 has a softening point above 200° C. In similar ways, highly crystalline polybutene-1, polypentene-1 and poly-4,4-dimethyl pentene-1 are obtained which, like the other polymers herein described, exhibit very high crystallinities as shown by the X-ray diffraction patterns. The poly-4,4-dimethyl pentene-1 produced in accordance with this invention softens above 300° C.

The polyolefins prepared in accordance with this invention can be molded or extruded into flexible plates or films. The products can also be extruded to form pipe or tubing of greater rigidity than can be achieved with polymers of lower crystallinity, and they can be injection molded into a great variety of articles. The polymers can also be cold drawn into ribbons, bands, fibers or filaments of high elasticity and improved rigidity. Fibers of extremely high strength can be spun from the molten polymers obtained according to this invention to give fibers having tenacities equal to or greater than the strongest fibers known heretofore. The high melting points and high strengths of the products embodying this invention make them useful for such applications as tire cord, magnetic tape base, photographic film base, and similar applications as well as the usual molding and casting applications. Two or more of the olefins herein described can also be copolymerized to form true copolymers which can be varied over the entire range of physical characteristics by varying the percentage of any component in the mixture being polymerized. Particularly useful copolymers are readily prepared by copolymerizing ethylene and propylene in the range of from 5–95% ethylene to 95–5% propylene.

The polymerization embodying the invention can be carried out batchwise or in a continuous flowing stream process. The process can also be carried out at temperatures below or above the melting point of the polymer being produced as desired. When the polymer has been formed, it is usually desirable to remove the catalyst from the polymeric product, and this can be accomplished by washing the powdered polymer with alcoholic acid or alcoholic base solutions. At temperatures below the melting point of the polymer, the crude polymer is obtained in the form of a finely divided powder which can be readily freed of catalyst. In some cases, particularly when operating at temperatures above the melting point of the polymer, the product may be obtained in the form of relatively large hardened chunks which should be converted to the powdered form prior to the catalyst removal step. This size reduction can be conveniently accomplished by dissolving the polymer in a hot mixture of an aromatic hydrocarbon and an alcohol, such as a mixture of xylene and 2-ethylhexanol, and then re-precipitating the polymer. When a solvent for the polymer at the polymerization temperature is used as vehicle, the hot polymer solution can be filtered before cooling in order to aid the removal of catalyst and consequent production of colorless polymers. The pressure in the polymerization system is readily achieved by pressuring the reactor with the monomer or monomers to be polymerized and continuously adding monomer to the system in order to maintain the pressure at the desired value throughout the course of the polymerization. When a continuous process is employed, a polymerization mixture of constant composition is desirably introduced into the polymerization zone continuously and progressively, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other polymerizable or non-polymerizable materials such as other α-monoolefins or such materials as hydrogen or saturated hydrocarbons such as methane, ethane or propane. Ordinarily, relatively pure monomers are employed unless copolymers are desired.

The amount of vehicle employed can be varied over rather wide limits relative to the monomer. The concentration of the monomer in the vehicle will depend upon the reaction conditions and will usually range from about 2 to 50% by weight, or preferably from about 2 to about 10% by weight based on the weight of the vehicle. Concentrations of monomer in the vehicle of about 3–7% by weight are commonly employed, although higher concentrations ordinarily increase the rate of polymerization. Concentrations above 5–10% by weight are ordinarily less desirable, particularly when the polymer dissolves in the reaction medium since this results in a very viscous solution. The polymerization time can be varied as desired from a period of a few minutes or hours to several days. When a continuous process is employed, the temperature is desirably regulated at a relatively constant value, and the contact time in the polymerization can also be regulated as desired. In some cases, it is not necessary to employ reaction times much beyond one-half to one hour since a cyclic system can be employed involving precipitation of the polymer and return of the vehicle and unused catalyst to the charging zone wherein the catalyst can be replenished and additional monomer introduced. The polymerization is desirably carried out under such conditions that the vehicle employed is maintained in liquid form during the polymerization.

The polymerization is ordinarily accomplished by merely admixing the components of the polymerization mixture and raising the temperature until polymerization begins as indicated by a pressure drop in the system when superatmospheric pressure obtained by the monomer charged to the reactor is used. When operating at atmospheric pressure, the gaseous olefin can be merely bubbled through the catalyst slurry, although it is desirable to employ elevated pressures so that higher concentrations of monomer in the mixture are obtained and losses of vehicle are minimized. Temperature control of the polymerization process is relatively simple since the solvent vehicle forms a high percentage of the polymerization mixture and hence can be heated or cooled to maintain the temperature as desired.

The invention is illustrated by the following examples of certain preferred embodiments thereof which are intended to be merely illustrative and not to limit the scope of the invention unless otherwise specifically indicated.

Example 1

A slurry of 0.7 part by weight of titanium borohydride in 100 vol. of dry heptane was charged to a 500-vol. pressure reactor under anhydrous conditions and in a nitrogen atmosphere. With the catalyst slurry being agitated, ethylene was admitted to the reactor at 30 p.s.i. pressure and maintained at 25–30 p.s.i. and at room temperature while the polymerization mixture was agitated for four hours. The resulting product was washed with ethyl alcohol, and the resulting precipitate was washed with water containing 10% ethyl alcohol and dried in a circulating air oven at 50° C. The yield of highly crystalline polyethylene was 14.7 parts by weight of solid polymer having a density of 0.951 and a softening point of 125–130° C. The inherent viscosity of the polyethylene in tetralin at 140° C. was 2.13. This material had a stiffness considerably greater than the conventional polyethylene and was readily molded into articles of increased rigidity and high strength. Its greatly increased softening point made this polymer suitable for use in applications where the article came in contact with boiling water.

Example 2

The process of Example 1 was repeated with ethylene as the monomer being polymerized except that the polymerization temperature was increased to 75° C. The yield of high density, highly crystalline polyethylene was 12.3 parts by weight of material having a softening point above 125° C. and an inherent viscosity of 1.72. The process was then again repeated using a polymerization temperature of 90° C. whereupon the yield of high density polyethylene was increased to 17.1 parts by weight of solid material having an inherent viscosity of 1.35.

Example 3

The process embodying the invention is equally applicable to polymerizing the other α-monoolefins which is in contrast to many catalytic methods wherein ethylene is readily polymerized but wherein propylene and the other higher olefins are not polymerized to give high molecular weight polymers. Thus, a 300-vol. autoclave was charged with a slurry of 0.7 part by weight of titanium borohydride in 100 vols. of dry heptane under nitrogen and under anhydrous conditions. The autoclave was then closed, and 80 vols. of propylene was admitted through a blowcase. The temperature of the polymerization mixture was raised to 70° C., at which temperature the pressure in the reactor was 200 p.s.i. This pressure and temperature were maintained for 8 hours during which time polymerization was allowed to proceed. The product was worked up as described in Example 1 to give 9.8 parts by weight of highly crystalline polypropylene having a softening point above 155° C., a density of 0.917 and an inherent viscosity of 1.97. The crystalline nature of the product was confirmed by its X-ray diffraction pattern, and the unusually high density and softening point are illustrated by comparison with amorphous polypropylene which has a melting point of 80° C. and a density of 0.85. This high density polypropylene could be readily melt spun to form very high strength fibers and also could be molded in the usual way to give molded articles of exceptional rigidity and toughness. When varying amounts of ethylene and propylene in admixture were subjected to similar polymerization conditions, true copolymers were obtained which ranged in properties depending upon the relative concentrations of the two monomers from the properties of the ethylene homopolymer to the properties of the propylene homopolymer.

*Example 4*

The branched olefins also polymerized very readily using the titanium borohydride catalyst in a concentration of approximately 1% by weight in an alkane vehicle. The exceptionally high melting points of these branched chain materials made them of great utility for high temperature applications wherein polyethylene is wholly unsuitable. Thus, 3-methyl butene-1 was polymerized at a temperature of 150° C. and 200 p.s.i. pressure to give 18.1 parts by weight of solid highly crystalline poly-3-methyl butene-1 having a softening point above 240° C. and an inherent viscosity of 1.34.

*Example 5*

The 300-vol. autoclave was charged with a 1% slurry of titanium borohydride in dry heptane and pressured with 4-methyl pentene-1 through a blowcase in an amount such that the pressure reached 200 p.s.i. at a polymerization temperature of 125° C. This pressure was maintained by periodic introduction of additional monomer, and the temperature was held relatively constant for 8 hours whereupon 7.3 parts by weight of highly crystalline poly-4-methyl pentene-1 was obtained having a softening point above 200° C. and an inherent viscosity of 1.61. The procedure was also repeated using butene-1, pentene-1 and 4,4-dimethyl pentene-1 as monomers respectively in place of the 4-methyl pentene-1. In all cases, the polymerization proceeded to give highly crystalline solid polymers as evidenced by the X-ray diffraction pattern. The poly-4,4-dimethyl pentene-1 was particularly unusual in that it exhibited a softening point above 300° C. The polybutene-1, which had a melting point above 125° C., was in marked contrast to atactic polybutene-1 which has a melting point of only 62° C.

The invention thus provides a method whereby not only ethylene but also the higher normally gaseous aliphatic α-monoolefins are readily polymerized to solid high molecular weight polymers exhibiting the high crystallinity characteristic of isotactic polymers. The polymerization is effected using but a single component catalyst which is in contrast to the usual catalyst systems wherein it is necessary to employ an activator in order to achieve any substantial polymerization even with ethylene as the monomer, despite the fact that ethylene is the most readily polymerized of the usual α-monoolefins. By means of this invention, a wide variety of polyolefins can be readily prepared using the same catalyst, and the catalyst is suitable not only for forming the homopolymers but also copolymers of the various monomers defined herein.

The polymers thus obtained can be extruded, mechanically milled, cast or molded as desired. The polymers are sometimes particularly valuable as blending agents with the relatively more flexible atactic polymers such as high-pressure polyethylene to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in detail with reference to certain preferred embodiments thereof, variations and modifications can be effected within the spirit and scope of the invention as described hereinabove and as defined in the appended claims.

I claim:

1. In the polymerization of at least one α-monoolefinic hydrocarbon containing 2–10 carbon atoms to form solid polymer, the improvement in forming highly crystalline polymer which comprises effecting the polymerization in the presence of a catalyst consisting of titanium borohydride.

2. In the polymerization of at least one aliphatic α-monoolefinic hydrocarbon containing 2–10 carbon atoms to form solid polymer, the improvement in forming highly crystalline polymer which comprises effecting the polymerization in an inert organic liquid vehicle containing a catalyst consisting of titanium borohydride.

3. The method of polymerizing a straight chain aliphatic α-monoolefinic hydrocarbon containing 2–10 carbon atoms to form solid polymer which comprises contacting said α-monoolefinic hydrocarbon in an inert organic liquid vehicle and at superatmospheric pressure with a catalyst consisting of titanium borohydride.

4. The method of polymerizing a branched chain aliphatic α-monoolefinic hydrocarbon containing 2–10 carbon atoms to form solid polymer which comprises contacting said α-monoolefinic hydrocarbon in an inert organic liquid vehicle and at superatmospheric pressure with a catalyst consisting of titanium borohydride.

5. The method of polymerizing ethylene to solid polymer of high crystallinity and high density which comprises bringing together, in an inert organic liquid vehicle free of combined oxygen and at a pressure of at least 25 p.s.i. and a temperature of 20–200° C., ethylene and a catalyst consisting solely of titanium borohydride, said catalyst amounting to from 0.01 to 10% by weight based on the weight of said vehicle.

6. The method of polymerizing propylene to solid polymer of high crystallinity and high density which comprises bringing together, in an inert organic liquid vehicle free of combined oxygen and at a pressure of at least 25 p.s.i. and a temperature of 20–200° C., propylene and a catalyst consisting solely of titanium borohydride, said catalyst amounting to from 0.01 to 10% by weight based on the weight of said vehicle.

7. The method of polymerizing 3-methyl butene-1 to solid polymer of high crystallinity and high density which comprises bringing together, in an inert organic liquid vehicle free of combined oxygen and at a pressure of at least 25 p.s.i. and a temperature of 20–200° C., 3-methyl butene-1 and a catalyst consisting solely of titanium borohydride, said catalyst amounting to from 0.01 to 10% by weight based on the weight of said vehicle.

8. The method of polymerizing 4-methyl pentene-1 to solid polymer of high crystallinity and high density which comprises bringing together, in an inert organic liquid vehicle free of combined oxygen and at a pressure of at least 25 p.s.i. and a temperature of 20–200° C., 4-methyl pentene-1 and a catalyst consisting solely of titanium borohydride, said catalyst amounting to from 0.01 to 10% by weight based on the weight of said vehicle.

9. The method of polymerizing 4,4-dimethyl pentene-1 to solid polymer of high crystallinity and high density which comprises bringing together, in an inert organic liquid vehicle free of combined oxygen and at a pressure of at least 25 p.s.i. and a temperature of 20–200° C., 4,4-dimethyl pentene-1 and a catalyst consisting solely of titanium borohydride, said catalyst amounting to from 0.01 to 10% by weight based on the weight of said vehicle.

10. The method of polymerizing an aliphatic α-monoolefinic hydrocarbon of 2–10 carbon atoms which comprises bringing together, in an inert organic liquid vehicle free of combined oxygen and at a temperature of 70–200° C. and a pressure of at least 25 p.s.i. and sufficient to maintain said vehicle in liquid form at said temperature, said α-monoolefinic hydrocarbon and a catalyst consisting solely of titanium borohydride, said catalyst amounting to from 0.01 to 10% by weight based on the weight of said vehicle.

11. The method of polymerizing ethylene to solid polymer of high crystallinity and high density which comprises bringing together, in an inert organic liquid vehicle free of combined oxygen and at a temperature of 90–180° C. and a pressure of at least 25 p.s.i. and sufficient to maintain said vehicle in liquid form at said temperature, ethylene and a catalyst consisting solely of titanium borohydride, said catalyst amounting to from 0.1 to 4% by weight based on the weight of said vehicle.

12. The method of polymerizing propylene to solid polymer of high crystallinity and high density which comprises bringing together, in an inert organic liquid vehicle free of combined oxygen and at a temperature of 70–180° C. and a pressure of at least 200 p.s.i., propylene and a catalyst consisting solely of titanium borohydride, said catalyst amounting to from 0.1 to 4% by weight based on the weight of said vehicle.

13. The method of polymerizing 3-methyl butene-1 to solid highly crystalline polymer which comprises bringing together in an inert organic liquid vehicle free of combined oxygen and at a temperature of 125–200° C. and a pressure of at least 200 p.s.i., 3-methyl butene-1 and a catalyst consisting solely of titanium borohydride, said catalyst amounting to from 0.1 to 4% by weight based on the weight of said vehicle.

14. The method of polymerizing 4-methyl pentene-1 to solid highly crystalline polymer which comprises bringing together in an inert organic liquid vehicle free of combined oxygen and at a temperature of 125–200° C. and a pressure of at least 200 p.s.i., 4-methyl pentene-1 and a catalyst consisting solely of titanium borohydride, said catalyst amounting to from 0.1 to 4% by weight based on the weight of said vehicle.

15. The method of polymerizing 4,4-dimethyl pentene-1 to solid highly crystalline polymer which comprises bringing together in an inert organic liquid vehicle free of combined oxygen and at a temperature of 125–200° C. and a pressure of at least 200 p.s.i., 4,4-dimethyl pentene-1 and a catalyst consisting solely of titanium borohydride, said catalyst amounting to from 0.1 to 4% by weight based on the weight of said vehicle.

16. The method of polymerizing propylene to a solid polymer which comprises bringing together, in an inert organic vehicle, propylene and a catalyst consisting essentially of titanium borohydride.

17. The method of polymerizing ethylene to a solid polymer which comprises bringing together, in an inert organic vehicle, ethylene and a catalyst consisting essentially of titanium borohydride.

References Cited in the file of this patent

UNITED STATES PATENTS

| | | |
|---|---|---|
| 2,717,889 | Feller et al. | Sept. 13, 1955 |
| 2,721,189 | Anderson et al. | Oct. 18, 1955 |
| 2,822,357 | Brebner et al. | Feb. 4, 1958 |
| 2,840,551 | Field et al. | June 24, 1958 |

FOREIGN PATENTS

| | | |
|---|---|---|
| 538,782 | Belgium | Dec. 6, 1955 |

OTHER REFERENCES

J. Am. Chem. Soc. (Hoekstra et al.), vol. 71, pp. 2488–92 (1949).